United States Patent [19]

Barnett et al.

[11] Patent Number: 5,408,272
[45] Date of Patent: Apr. 18, 1995

[54] METHOD OF PRODUCING A COMPOSITED VIDEO IMAGE BASED ON DEPTH

[75] Inventors: Ronnie D. Barnett, Nevada City; Frank S. Lawrence, Grass Valley, both of Calif.

[73] Assignee: The Grass Valley Group, Inc., Nevada City, Calif.

[21] Appl. No.: 165,790

[22] Filed: Dec. 13, 1993

[51] Int. Cl.⁶ .................................... H04N 5/265
[52] U.S. Cl. ............................ 348/585; 348/591; 395/22
[58] Field of Search .............. 348/591, 584, 598, 585, 348/586; 395/122, 158, 133; H04N 5/265

[56] References Cited

U.S. PATENT DOCUMENTS

| | | | |
|---|---|---|---|
| 4,360,831 | 11/1982 | Kellar | 348/585 |
| 4,684,990 | 8/1987 | Oxley | 358/183 |
| 4,825,391 | 4/1989 | Merz | 395/131 |
| 4,851,912 | 7/1989 | Jackson et al. | 358/183 |
| 4,992,780 | 2/1991 | Penna | 395/131 |
| 5,227,863 | 7/1993 | Bilbrey et al. | 348/585 |
| 5,280,568 | 1/1994 | Obata | 395/122 |

FOREIGN PATENT DOCUMENTS

3297285 12/1991 Japan ................ H04N 5/265

*Primary Examiner*—James J. Groody
*Assistant Examiner*—Jeffrey S. Murrell
*Attorney, Agent, or Firm*—Francis I. Gray

[57] ABSTRACT

A method of producing a composited video image based on depth uses a serial combiner to which a plurality of video input signals, representing video images, and priority signals are input. The video input signals each have an associated depth signal. The depth signals are sorted from farthest to nearest and a matrix control signal is generated from the depth signals. The matrix control signal is used to route the video input signals to appropriate inputs of the serial combiner in order from farthest to nearest. The priority signals are derived from the depth signals either serially or in parallel.

19 Claims, 7 Drawing Sheets

METHOD OF PRODUCING A COMPOSITED VIDEO IMAGE BASED ON DEPTH

BACKGROUND OF THE PRESENT INVENTION

The present invention relates to the combining of video images, and more particularly to a method of producing a composited video image based on depth by sorting depth signals associated with the video images from farthest to nearest before inputting of the video images to a serial combiner.

Previous methods of combining video images, as in the Kaleidoscope Digital Video Effects product manufactured by The Grass Valley Group, Inc. of Grass Valley, Calif., United States of America, perform in a serial manner. Two images are combined, and the resulting image becomes a new image that can then be combined with a third image. U.S. Pat. No. 4,851,912, issued to Jackson et al on Jul. 25, 1989 entitled "Apparatus for Combining Video Signals", describes such a combination process in which the two video images are combined on the basis of a priority signal as shown in FIG. 2 of that patent. This priority signal may be made up of a combination of the depth signals from the foreground and background video images. The priority signal may be passed from stage to stage, as are the video and key signals associated with the video image, to provide input to the generation of the priority signal for the next combination stage. However if two video images are combined with priority based on depth and then a third depth based video image is combined in a serial fashion with the previously combined video images, improper priorities may result.

A type of parallel combining is disclosed in U.S. Pat. No. 4,684,990 issued Aug. 4, 1987 to Leslie J. Oxley entitled "Method and Apparatus for Combining Multiple Video Images in Three Dimensions." FIGS. 5A and 5B of the Oxley patent show a four channel depth to "coefficient" converter. If this configuration is increased to a five channel converter, for example, each stage requires additional circuitry as well as the addition of another stage. Such additional circuitry would include one more depth circuit 36, ten more subtractors 52, ten more weighting circuits 54, ten more minimum circuits 56, one more clip circuit 58, one more multiplier 60, ten more inverters 62, one more final minimum circuit 64 with an additional input for all, one more output multiplier 72 and an added input for summing circuit 68. Adding just one additional layer therefore adds large amounts of circuitry with the attendant additional cost.

What is desired is a method of combining a plurality of video images based on depth that maintains proper depth order between the video images in a simple, cost effective manner.

SUMMARY OF THE INVENTION

Accordingly the present invention provides a method of producing a composited video image based on depth that orders the depth signals, associated with a plurality of video input signals representing the video images, from farthest to nearest before serially combining the video images. The video input signals are delayed and input to a crosspoint matrix. The associated depth signals are input to a depth comparator and sorting circuit that orders the depth signals and produces a matrix configuration control signal for the crosspoint matrix to route the video input signals to appropriate serial combiners. The sorted depth signals are input to a depth to priority converter, in either serial or parallel implementation, to produce appropriate priority signals for the combiners as well as combined depth signals as outputs. The combiners composite the video input signals in sequence to produce the composited video image signal.

The objects, advantages and novel features of the present invention are apparent from the following detailed description when read in conjunction with the appended claims and attached drawing.

DESCRIPTION OF THE PREFERRED EMBODIMENT

Figure 1:
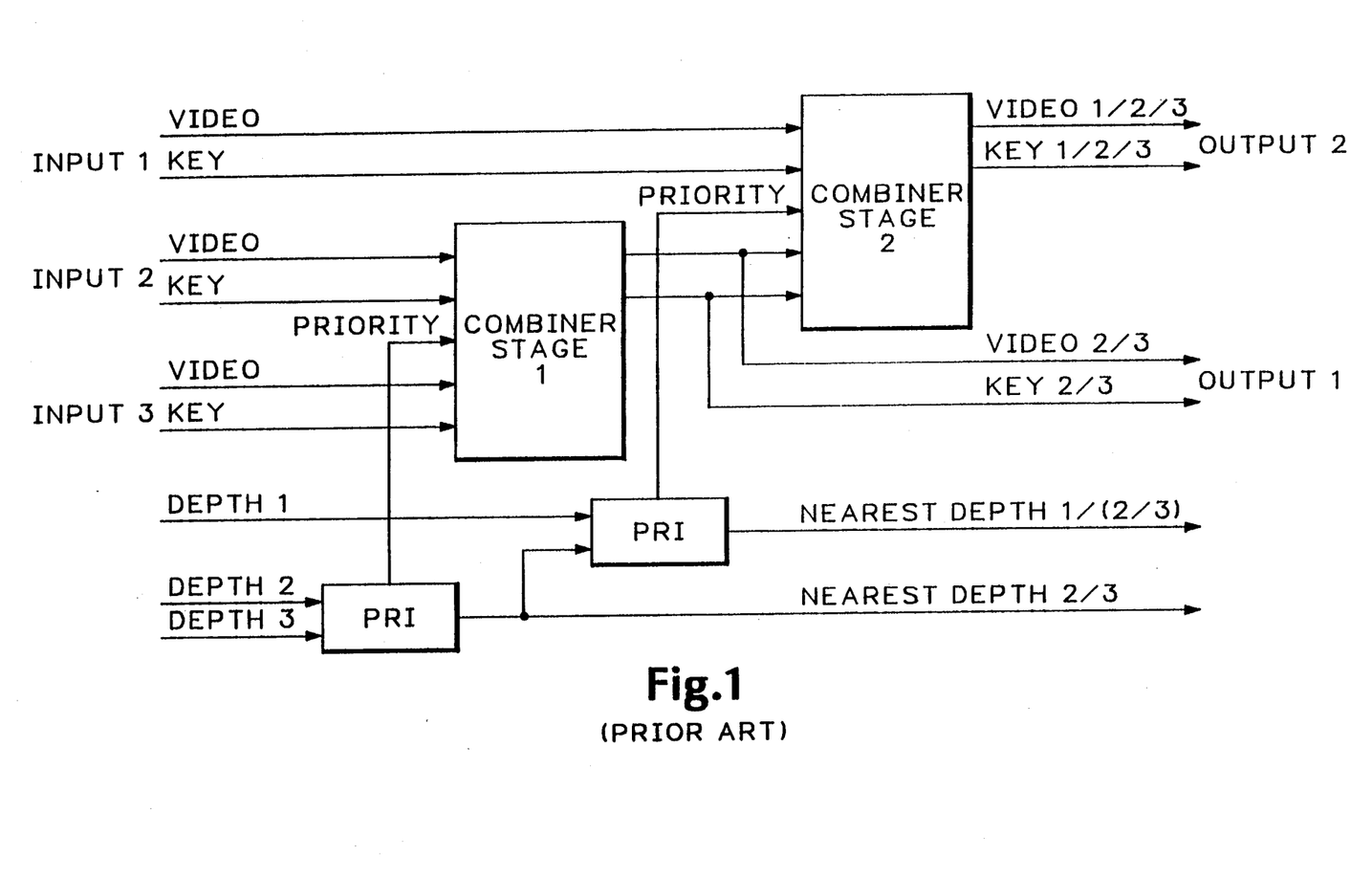
FIG. 1 is a block diagram of a prior art serial combiner architecture for combining a plurality of video input signals.

Referring now to FIG. 1 three video input signals, each having an associated depth signal, are input to a combiner according to the prior art. The depth signals associated with video input signals 2 and 3 are input to a depth to priority circuit to produce a first priority signal and a first combined depth signal that is the nearest depth of video input signals 2 and 3. The video input signals 2 and 3 are input together with the first priority signal to a first combiner stage, such as that described in U.S. Pat. No. 4,851,912 referred to above, to produce a first composited output signal. The first composited output signal is input, together with video input signal 1 and a second priority signal derived from the first combined depth signal and the depth signal associated with video input signal 1, to a second combiner stage to produce a final composited output signal that is the combination of the three video input signals. If video input signal 1 has an associated relative depth that is between the video input signals 2 and 3, the visual effect should be that video input signal 1 is between the other video input signals. In fact what happens is that video input signal 1 appears to be behind both of the other video input signals since the first combined depth signal, representing the nearest of the depths of video input signals 2 and 3, is combined with the depth signal for video input signal 1. If video input signal 1 had the nearest depth signal of the three video input signals, then the result would be correct.

Figure 2A:
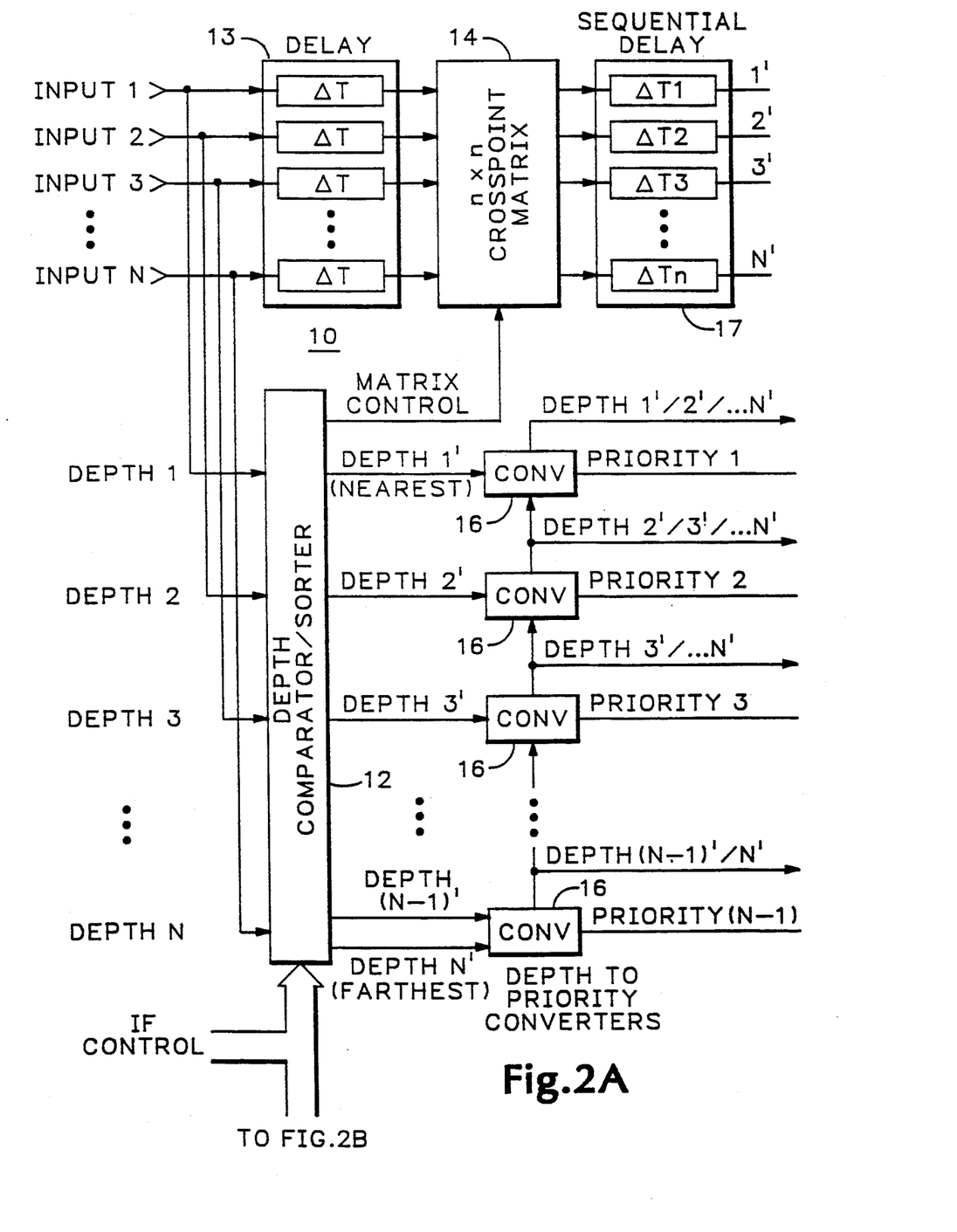
FIGS. 2A and 2B are a block diagram of a combiner architecture that sorts depth signals associated with a plurality of video input signals prior to combining the video input signals according to the present invention.
Figure 2B:
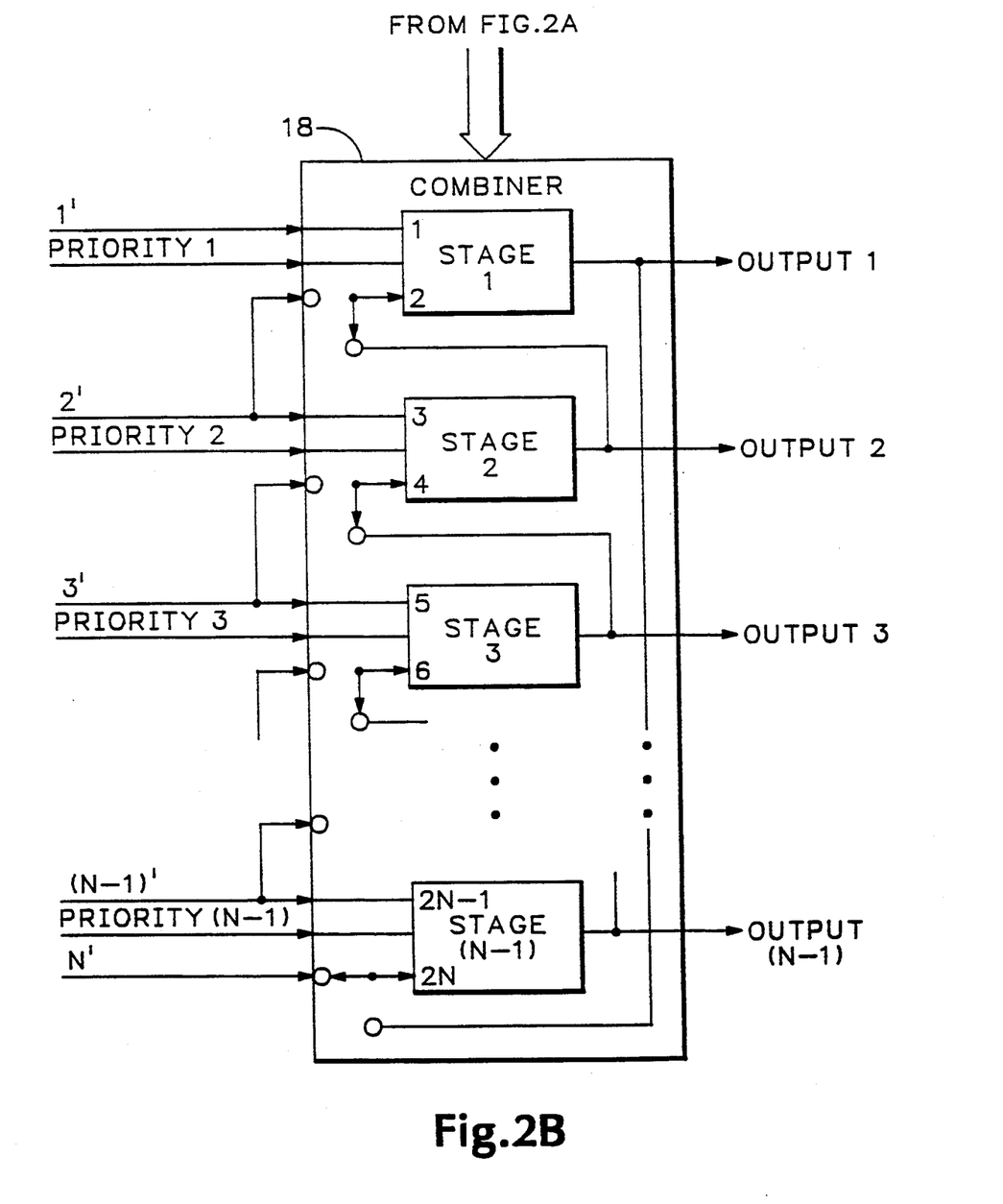

An apparatus 10 for combining a plurality of video input signals, each having an associated depth signal, is shown in FIGS. 2A and 2B. The depth signals, 1 through n, are input to a depth comparator and sorting circuit 12. The depth comparator and sorting circuit 12 sorts the depth signals from farthest to nearest to produce new depth signals 1' through n', where n' is the farthest and 1' is the nearest. The results of this sort produces a matrix configuration control signal for an nxn crosspoint matrix 14 that routes the video input signals on a pixel by pixel basis to appropriate matrix outputs. Also the sorted depth outputs, 1' through n', are input to depth to priority converter circuits 16 to produce priority signals for the combiner stages of a serial combiner 18. The video input signals are input to a first delay circuit 13 to compensate for the time required to perform the sorting of the associated depth signals in the depth comparator and sorting circuit 12. The delayed video input signals are applied to the inputs of the crosspoint matrix 14 and are routed to the outputs of the crosspoint matrix according to the matrix configuration control signal that is based on the results of the sorting. The outputs from the crosspoint matrix 14, sorted in correct depth order, are applied to a second sequential delay circuit 17, where the ordered video input signals are delayed according to the sequence in which they are entered into the serial combiner 18, as described in the previously mentioned U.S. Pat. No. 4,851,912. The depth to priority signal conversion is relatively simple and may be accomplished by considering only two consecutive depth signals simultaneously. The combined depth output of any converter stage of the serial combiner 18 is the nearest of the two depth signals at the input to that stage.

Figure 3:
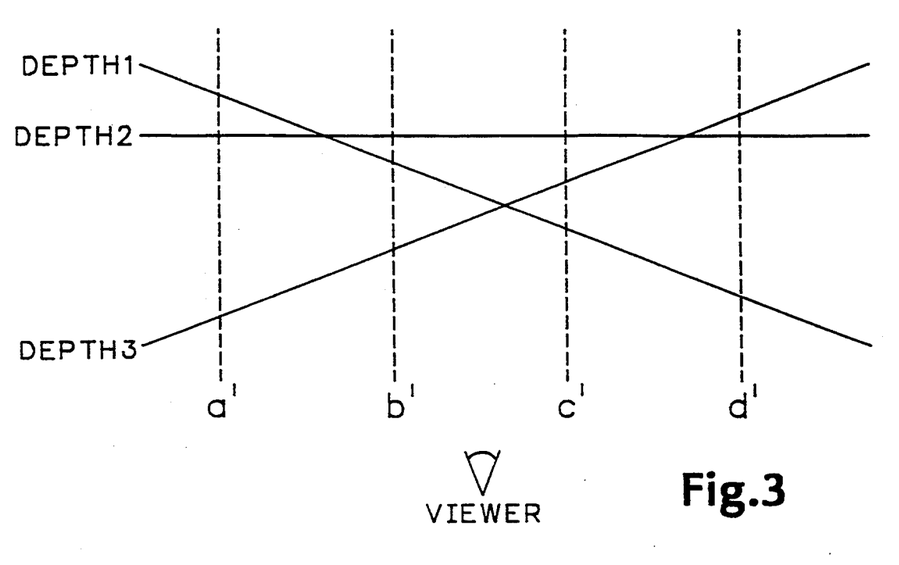
FIG. 3 is an illustration of how video input signals are combined according to the present invention.

The examples of depth signals discussed above are relatively simple, i.e., all the depth signals represent constant relative depths. FIG. 3 represents a slightly more complicated example where the three video input signals provide three images having the visual effect of three intersecting planes. As an example of what the circuitry of FIGS. 2A and 2B does, examine first the pixels along the dotted line noted as a'. At this point three input pixels contribute to the output pixel. The depths of each input pixel are sorted in the depth comparator and sorting circuit 12. The result is that video input signal 1 is the farthest from a viewer, video input signal 2 is between video input signals 1 and 3, and video input signal 3 is the nearest to the viewer. The crosspoint matrix 14 is directed by the matrix configuration control signal from the sorting circuit 12 to provide video input signal 1 to input 4 of the serial combiner 18 (stage 2), video input signal 2 to input 3 of the serial combiner (stage 2), and video input signal 3 to input 1 of the serial combiner (stage 1), using the first two combiner stages. The output of serial combiner stage 2 is provided to input 2 (stage 1). Now at b' video input signal 2 is the farthest depth, with video input signal 1 in the middle and video input signal 3 still the nearest. Therefore at this point the crosspoint matrix 14 directs video input signal 2 to combiner input 4, video input signal 1 to combiner input 3 and video input signal 3 to combiner input 1. Likewise the crosspoint matrix 14 is directed by the sorting circuit 12 to route the video input signals to the proper inputs of the serial combiner 18 at points c' and d'. Although the present examples are presented in terms of three video input signals, the method may be extended to any number of video input signals.

Figure 4:
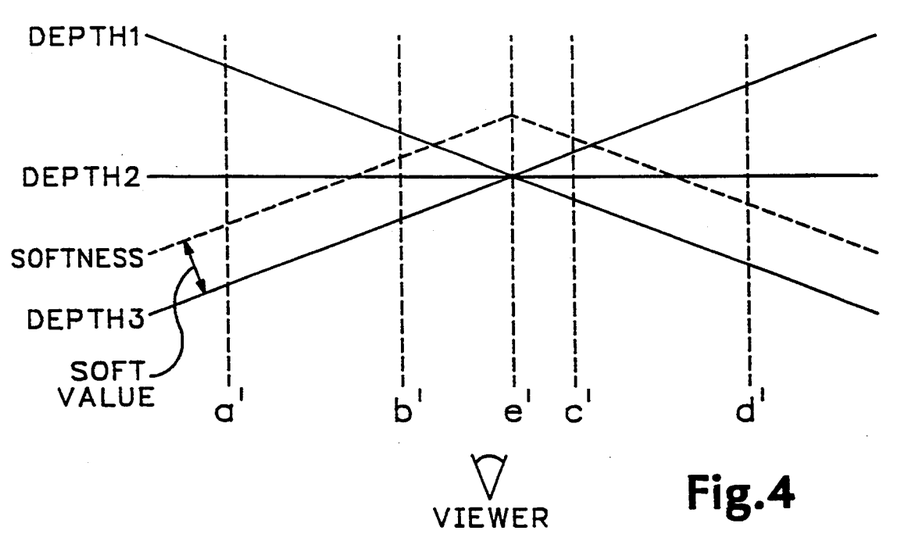
FIG. 4 is an illustration of how video input signals are combined at intersections according to the present invention.
Figure 5:
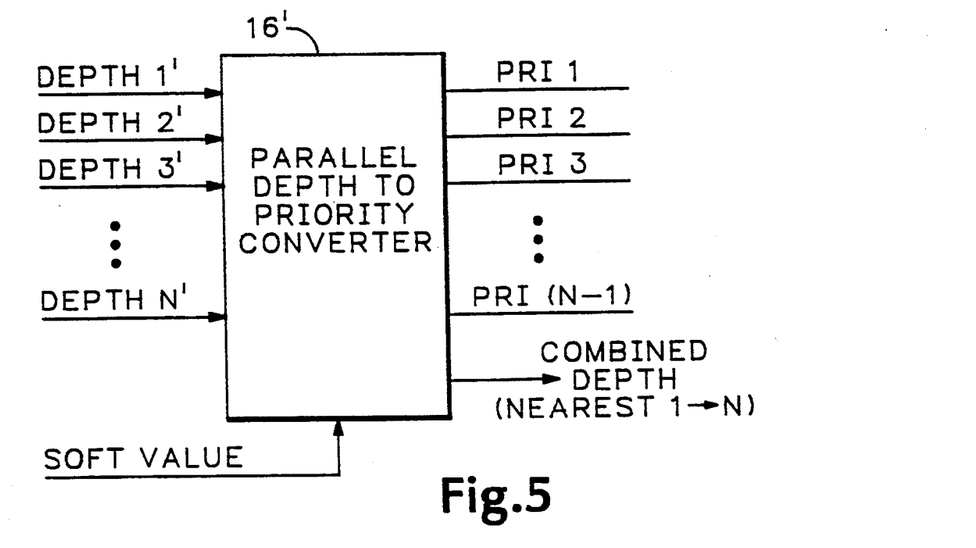
FIG. 5 is a basic block for a parallel depth to priority converter to replace the serial depth to priority converters of FIG. 2.

A more complex example for three video input signals is shown in FIG. 4 where more than two video input signals intersect at a single pixel. At the point e' the circuitry of FIGS. 2A and 2B cannot determine which of the three pixels is in front. Therefore the pixels are combined in an order such that two of the video input signals are combined at 50% each, and the result is combined with the third video input signal at 50% each. The final result is a 25%, 25% and 50% combination where the true combination should be 33.3% for each. If the sorting circuit 12 output is used to determine priority coefficients for all video input signals simultaneously instead for just two at a time, then all points of the composite output image are processed correctly. This may be achieved by replacing the serial depth to priority converters 16 with a parallel depth to priority converter 16', as shown in FIG. 5. The parallel depth to priority converter 16' has the sorted depth signals, 1' to n', as inputs and provides the required n−1 priority signals and the combined depth signal as outputs. An additional input to the parallel depth to priority converter 16' is a softness parameter, SOFT VALUE, which is variable and controlled by an operator.

Referring again to FIG. 4 SOFT VALUE is subtracted from the nearest depth value, i.e., the combined depth value, to produce a softness range indicated by the dotted line. SOFTNESS=DEPTH 1' (nearest)−−SOFT VALUE, where SOFT VALUE>0. SOFTNESS is farther than the nearest pixel after sorting by the depth sorter 12. The priorities are determined by the general equation:

PRIORTY(K,K + 1) =
 (DEPTH K − SOFTNESS)/((DEPTH K − SOFTNESS) +
  (DEPTH(K + 1) − SOFTNESS) + (DEPTH(K + 2) −
   SOFTNESS) + ... + (DEPTH(K + M) − SOFTNESS))

where K is the video input signal of interest after depth sorting, K+1 is the next video input signal behind K, etc. until K+M which is the last or farthest video input signal. If any of the (DEPTH−SOFTNESS) calculations are negative, they are limited to zero.

Using FIG. 4 as an example at point a' the priority PRI3/2 between video input signals 3 and 2 is:

(SOFT VALUE)/((SOFT VALUE)+(DEPTH
 2−SOFTNESS)+(DEPTH 1−SOFTNESS))

Figure 6:
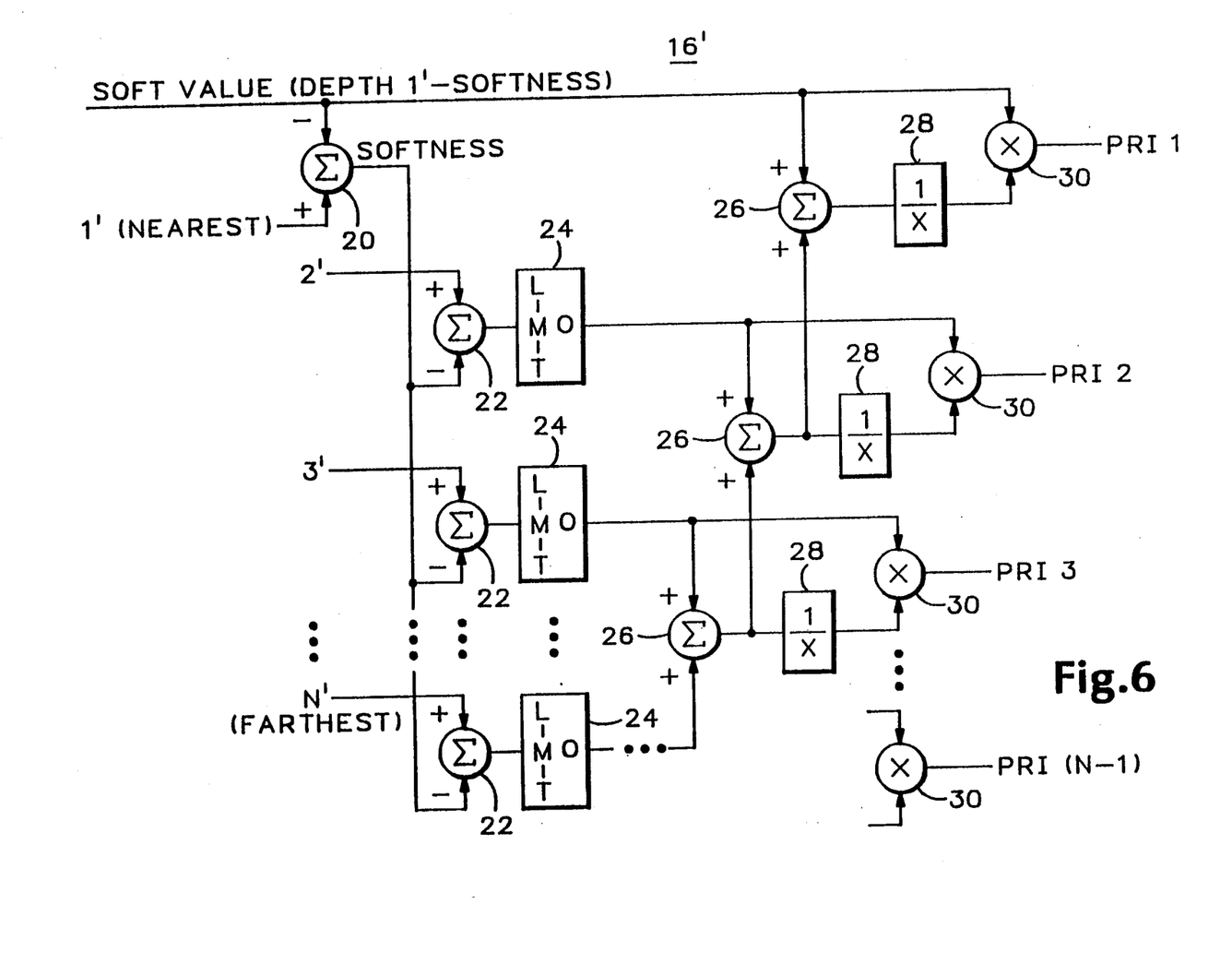
FIG. 6 is a block diagram of the parallel depth to priority converter of FIG. 5.

However the softness range falls in front of video input signals 2 and 1. Therefore the (DEPTH 2−SOFTNESS) and (DEPTH 1−SOFTNESS) terms are both negative and are thus limited to zero. The final value for PRI3/2 becomes (SOFT VALUE)/(SOFT VALUE), which is one. In other words video input signals 2 and 1 don't contribute to the final composite at a'. The priority PRI2/1 between video input signals 2 and 1 is:

(DEPTH 2−SOFTNESS)/((DEPTH
 2−SOFTNESS)+(DEPTH 1−SOFTNESS)

which yields 0/0. This special case needs to be defined as zero. Generally in any of the cases where the numerator is zero, the priority output is defined as zero. From FIG. 6 for each layer outside of the softness range each limiter 24 limits the value to zero, which in turn is one input to each multiplier 30 causing the output of each multiplier to be zero regardless of the value at the other input. Thus the hardware provides the correct answer.

At point b' of FIG. 4 PRI3/2 is:

(SOFT VALUE)/((SOFT VALUE)+(DEPTH 2−SOFTNESS)+(DEPTH 1−SOFTNESS))

At this point video input signals 3 and 2 are within the softness range indicated by the dotted line, but video input signal 1 is again negative and therefore limited to zero. The final result for PRI3/2 is:

(SOFT VALUE)/((SOFT VALUE)+(DEPTH 2−SOFTNESS))

and PRI2/1 is:

(DEPTH 2−SOFTNESS)/((DEPTH 2−SOFTNESS)+(DEPTH 1−SOFTNESS))

or unity since (DEPTH 1−SOFTNESS) is limited to zero.

At point e' where all of the video input signals intersect, they are all within the softness range. PRI3/2 is:

(SOFT VALUE)/((SOFT VALUE)+(DEPTH 2−SOFTNESS)+(DEPTH 1−SOFTNESS))

and PRI2/1 is:

(DEPTH 2−SOFTNESS)/((DEPTH 2−SOFTNESS)+(DEPTH 1−SOFTNESS))

The proportionality of each video input signal at point e' is:

SOFT VALUE=DEPTH 2−SOFTNESS=DEPTH 1−SOFTNESS

Therefore the proportion of video input signal 3 used in the final composite at point e' is:

INPUT3*(PRI3/2)=INPUT3*(SOFT VALUE)/((SOFT VALUE)+(DEPTH 2−SOFTNESS)+(DEPTH 1−SOFTNESS))=INPUT3*(⅓)

The proportion of video input signal 2 used in the final composite is:

INPUT2*(1 − *PRI3/2*)*(*PRI2/1* = 
  INPUT2*(1 − 1/3)*(DEPTH 2 − SOFTNESS)/((DEPTH2 − SOFTNESS) + DEPTH1 − SOFTNESS)) = 
    INPUT2*(2/3)*(1/2) = INPUT2*(1/3)

Finally the proportion of video input signal 1 used in the final composite is:

INPUT1*(1−PRI3/2)*(1−PRI2/1)=INPUT1*-(1⅓)*(1½)=INPUT1*(⅔)*(½)=INPUT1*(⅓)

Thus the proportions of the video input signals are mathematically correct at ⅓ each.

A circuit for implementing the parallel depth to priority converter 16' is shown in FIG. 5. The depth signal 1' for the nearest ordered video input signal is input to a first subtractor 20 together with the SOFT VALUE to produce the softness range SOFTNESS. The SOFTNESS is input to a plurality of second subtractors 22 together with the respective depth signals 2' through N' for the remaining ordered video input signals. The outputs from the second subtractors 22 are input to respective zero limit circuits 24 which provide a zero output for negative inputs. The SOFT VALUE and outputs from the respective limit circuits 24 are input to respective summation circuits 26 less one so that the farthest ordered video input signal limit circuit output is input to the same summation circuit as the output of the (N−1)' limit circuit. The second inputs for the remaining summation circuits 26 are from the outputs of the next farthest summation circuit. The outputs from the summation circuits 26 are input to respective inverter circuits 28. The outputs of the inverter circuits 28 form one input for respective output multipliers 30. The other input to the output multipliers 30 are the SOFT VALUE and outputs of the limit circuits 24 for depth signals 2' through (N−1') respectively. The outputs of the output multipliers 30 are the priority signals PRI1 through PRI(N−1).

The video images may be non-planar, i.e., the associated depth signals may be of a three-dimensional (3-D) shape, such as a page turn or a sphere from a graphics generator as disclosed in U.S. Pat. No. 5,077,608 issued Dec. 31, 1991 to Robert J. Dubner entitled "Video Effects System Able to Intersect a 3-D Image with a 2-D Image". Also any video input signal with compatible depth may be used. Examples of current systems using depth are the Kaleidoscope Digital Video Effects, Kadenza Digital Switcher and Graphics Factory products, all manufactured by The Grass Valley Group, Inc.

The various known non-depth combining modes, such as A over B, A intersect B, B over A, etc., also may be handled by the circuitry of FIGS. 2 and 5. In this mode the matrix configuration control signal from the sorting circuit 12 is derived by a control signal from a user interface, as shown in FIG. 2, which provides an apparent depth signal for each video input signal. For example in the case of A over B, A being video input signal 1 and B being video input signal 2, the crosspoint matrix 14 is directed to route input signal 1 to combiner input 1 and input signal 2 to combiner input 2 as if video input signal 1 had a depth signal nearer to the viewer than video input signal 2. The matrix configuration control signal also could be modulated with a realtime masking signal, such as a wipe edge, that would, for the two video input signal case, give the visual result of one image being in front of another image for a portion of the output image and then having the priorities, i.e., apparent depth signals, reverse for another portion of the output image.

For multiple video input signal combining, various priority combining methods may be accomplished. For three video input signals, video input signals 2 and 3 may be combined as A over B, and then video input signal 1 could be combined with the result as A intersect B, where "intersect" is a mathematical logic function. The final result is that video input signal 1 intersected with the combination of video input signals 2 and 3 produces an output only where there are common values of video input signal 1 and the combined video input signal 2, 3. The operator need not be concerned with what video input signal needs to go into what input of the combiner 18, but simply selects what video input signal is over or under what other video input signal and the crosspoint matrix 14 routes the video input signals to the appropriate combiner inputs.

Additionally channel pooling, where a group of video processor channels may be acquired by various control points, may be accomplished by this circuitry. For example, assume that two users, i.e., two control points, each want to acquire two video processors each from a pool of four video processors and combine the resulting two video input signals using the apparatus of FIGS. 2 or 5. If user #1 (control point 1) acquires channels that are connected to inputs 1 and 3 of the combiner 18, then user #2 (control point 2) acquires channels that are connected to inputs 2 and 4. When video input signals 1 and 3 are acquired by user #1, a tag equal to binary 2 is input to the most significant bits (MSBs), the number of MSBs determining the number of available control points, of the sorting circuit 12 on inputs 1 and 3. Similarly a tag equal to binary 1 is input to the two MSBs on inputs 2 and 4. When the sort is performed, the MSBs route video input signals 1 and 3 to combiner inputs 1 and 2, or 2 and 1 depending on the relative depths. Similarly video input signals 2 and 4 are routed to combiner inputs 5 and 6, or 6 and 5. The connection between combiner stage 2 and input 2 is broken according to the control signal from the user interface, as is the connection between stage 4 and input 6, and the output of combiner stage 3 becomes the combined OUTPUT3 for control point 2. The output of combiner stage 1 becomes the combined OUTPUT1 for control point 1. For non-depth combining modes, only the control point tag is sorted, i.e., the depth is ignored, and the matrix configuration control signal is a combination of the sorted control point tags and user input priorities, i.e., A over B, etc. An output router, not shown, may be provided at the combiner outputs so that any combination of video input signals may be accommodated, Thus if control point 1 requires three video input signals and control point 2 requires two video input signals, then the output for control point 1 is still combiner output 1 and the output for control point 2 is now combiner output 4.

Figure 7:
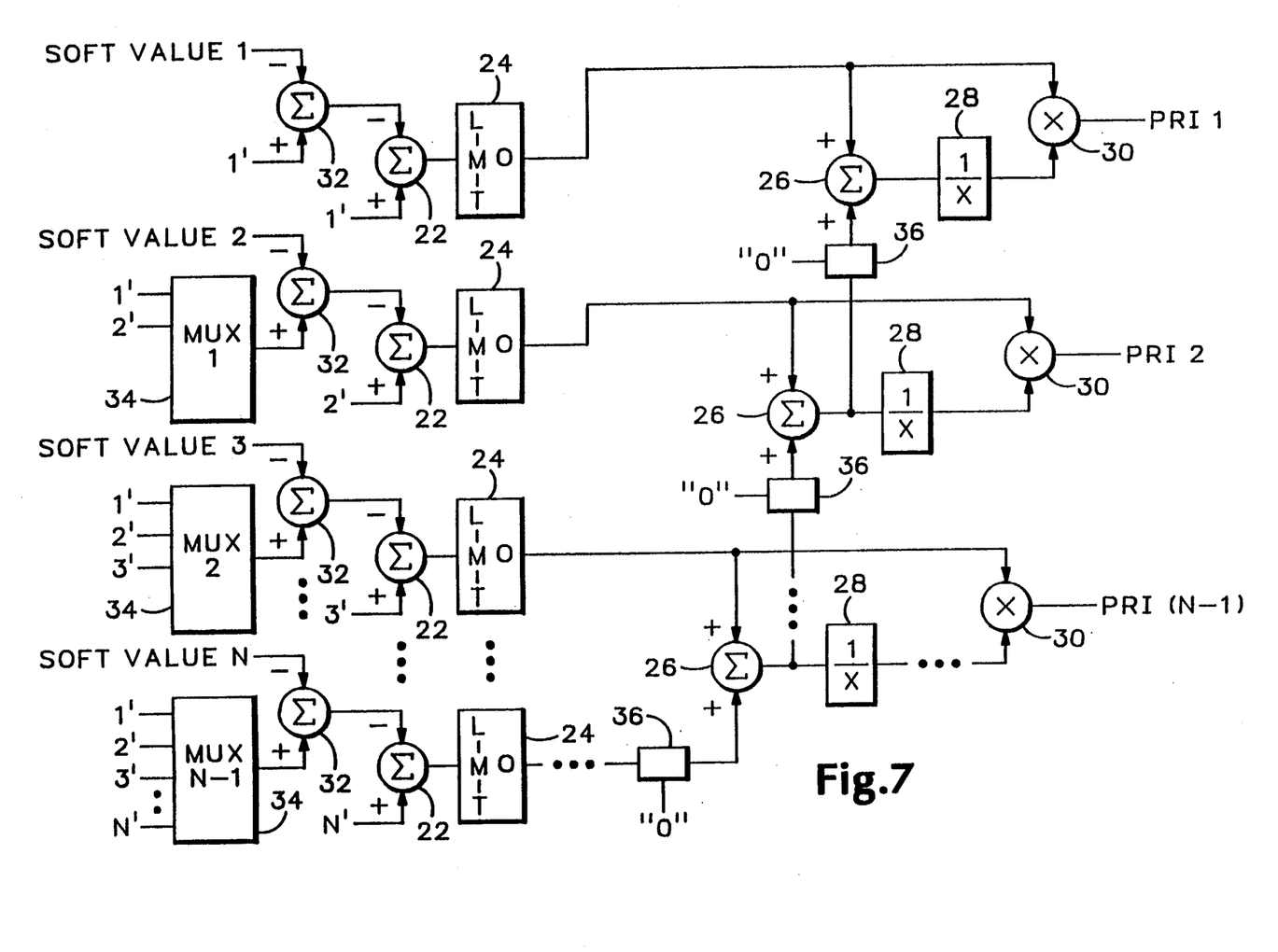
FIG. 7 is a partial block diagram of the parallel depth to priority converter of FIG. 5 adapted for channel pooling according to the present invention.

For channel pooling the parallel depth to priority converter 16' is modified as shown in FIG. 7 so that the priority signals may be broken into separate, independent priority signals for the respective control points. A softness subtractor 32 is inserted to combine a softness value according to the control point having access to those video sources with the depths for the video signals routed to the accessing control point. The output from the softness subtractor 32 is subtracted from the depth signal for that video in the second subtractors 22. For video signals other than the "nearest" a depth multiplexer 34 also is included. The depth multiplexers 34 select the appropriate depth signal for input to the respective softness subtractor 32. Finally a break multiplexer 36 is inserted between the output of the summation circuit 26 from a subsequent (further) depth and the input of the summation circuit for the next (nearer) depth. The break multiplexer 36 provides either a zero value "0" or the output of the subsequent summation circuit 26 to the next summation circuit. For the case where videos 1' and 2' are accessed by control point 1, the values for SOFT_VALUE_1 and SOFT_VALUE_2 are the same and the depth multiplexer MUX_1 selects the nearest depth value 1'. The priority is taken from PRI1 for stage 1 of the combiner 18. The priority is defined as:

PRI_1=(DEPTH_1'−SOFTVALUE_1)/((DEPTH_1'−SOFTVALUE_1)+(DEPTH_2'−SOFTVALUE_1)+0)

Control point 2 has the values for SOFT_VALUE_3 and SOFT_VALUE_N, where N=4, the same, and the depth multiplexers MUX2 and MUX_N−1 select depth 3', the nearest depth for control point 2. The priority is taken from PRI3 for stage 3 of the combiner 18 and is defined as:

PRI_3=(DEPTH_3'−SOFTVALUE_2)/((DEPTH_3'−SOFTVALUE_2)+(DEPTH_4'−SOFTVALUE_2)+0)

Figure 8:
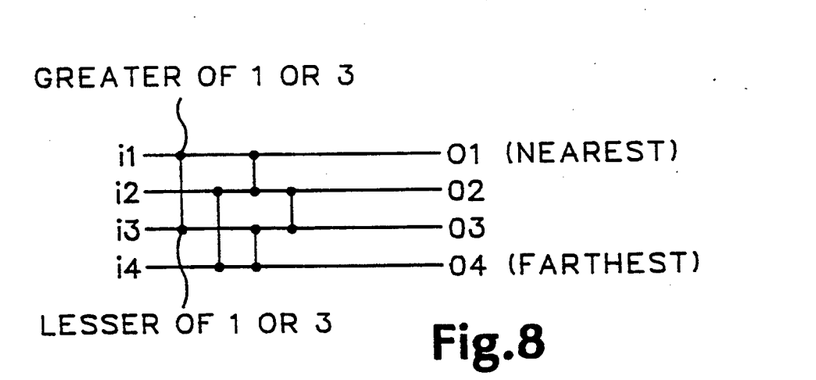
FIG. 8 is an illustration of a basic depth sorting algorithm according to the present invention.
Figure 9:
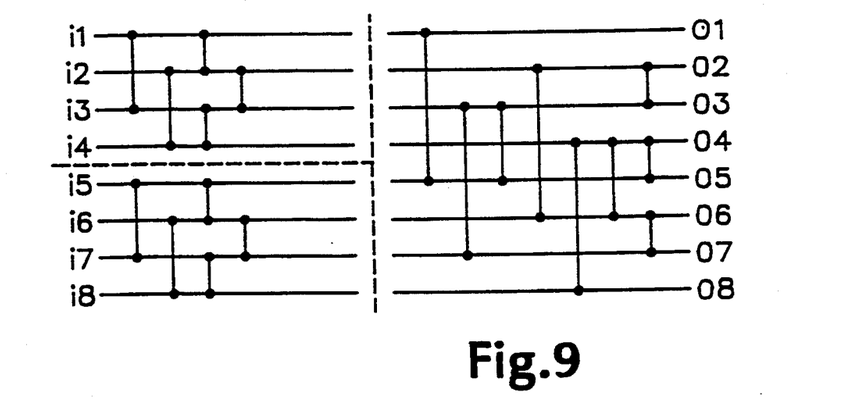
FIG. 9 is an illustration of a modular depth sorting algorithm according to the present invention.

The depth comparator and sorting circuit 12 may implement any type of sorting algorithm, many of which are described in the literature. One such algorithm is known as Batcher's merge-exchange sort. FIG. 8 illustrates an example of this sort for a four input, four output sort. Each vertical line represents a function whose characteristics are to compare two inputs and output the greater valued number on the upper output and the lesser valued number on the lower output. This method provides four inputs to be sorted most to least with five compares. FIG. 9 illustrates a method of using two of the above described four input sorts followed by an eight input merger. The merger takes two sorted input sets, in this case two sorted sets of four elements each, and merges the two sets into one set of eight outputs sorted most to least.

These are by no means the only methods of providing four or eight input sorts, but they do provide some modularity to a hardware design. To make a four-input combiner, one four-input sorter is used. To make an eight-input combiner, another four input sorter is added as well as a four by four to eight-output merger. Other methods are known that accomplish an eight-input/eight-output sort with less compares, but they are not "modular". Sorting may be extended to any number of inputs. The limiting factors are the number of compares and the time required to complete the sorting process.

Thus the present invention provides a method of compositing video images based upon depth by sorting the depth signals associated with the video images to produce a matrix configuration control signal for routing the video input signals representing the video images to appropriate inputs of a serial combiner and to produce appropriate priority values for each stage of a serial combiner.

What is claimed is:

1. An apparatus for combining a plurality of video input signals to form a composited video output signal, each video input signal having an associated depth signal, comprising:

means for sequentially combining the plurality of video input signals into the composited video output signal according to priority signals derived from the associated depth signals;

means for routing the video input signals to appropriate inputs of the combining means as ordered video input signals according to a matrix control signal;

means for sorting the associated depth signals in order from farthest to nearest to produce sorted depth signals, the sorting means providing the matrix control signal to the routing means to order the video input signals sequentially at the inputs of the combining means from farthest to nearest; and means coupled between the sorting means and the combining means for converting the sorted depth signals to the priority signals.

2. The apparatus as recited in claim 1 further comprising:

means for delaying the video input signals at the inputs to the routing means to compensate for delay time introduced by the sorting means in sorting the depth signals; and means coupled between the routing means and the combining means for sequentially delaying the ordered video input signals to compensate for delay time introduced by each combining of prior ones of the ordered video input signals in sequence by the combining means.

3. The apparatus as recited in claim 1 wherein the converting means comprises a plurality of depth to priority signal converters coupled in series such that a combined depth signal from one converter is coupled as an input to the next converter in the series, each converter having a pair of inputs for receiving depth signals, a depth signal output for providing the combined depth signal, and a priority signal output, the first converter in the series receiving the two farthest depth signals from the sorting means and each subsequent converter receiving the combined depth signal from the preceding converter and the next nearest depth signal from the routing means as inputs, the priority signal outputs providing the priority signals for the combining means.

4. The apparatus as recited in claim 1 wherein the converting means comprises a parallel depth to priority converter for simultaneously receiving the sorted depth signals from the sorting means to produce the priority signals for input to the combining means.

5. The apparatus as recited in claim 4 wherein the parallel depth to priority converter produces the priority signals from the depth signals as a function of a softness parameter.

6. The apparatus as recited in claim 5 wherein the parallel depth to serial converter comprises:

means for generating a softness range from the softness parameter and the nearest depth signal;

means for combining the softness range with the remaining depth signals to produce interim depth signals; and means for multiplying the softness parameter by the inverse of the sum of the softness parameter and the interim depth signals to obtain the priority signal for combining the two nearest video input signals, and for multiplying each subsequent interim depth signal with the inverse of the sum of that interim depth signal and the further subsequent interim depth signals to obtain the remaining priority signals.

7. The apparatus as recited in claim 6 wherein the parallel depth to priority converter further comprises means for limiting the interim depth signals to zero when the result of the softness range combining step produces a negative value.

8. The apparatus as recited in claim 1 wherein the sorting means comprises:

at least one sorting module for sorting a fixed number of depth signals from farthest to nearest to form interim sorted depth signals; and a merger module for combining the interim sorted depth signals from more than one sorting module into the sorted depth signals.

9. The apparatus of claim 1 wherein the associated depth signals for non-depth video input signals are provided via an operator interface.

10. The apparatus according to claim 1 further comprising means for controlling the combining and sorting means so that a first composite video output signal from a first set of the video input Signals is provided in response to a user control command and a second composite video output signal from a second set of the video input signals is provided in response to the user control command, the first set of video input signals having apparent depth signals nearer than apparent depth signals for the second set of video input signals and the combining means being separated into corresponding first and second combining means having the first and second sets of video input signals respectively as inputs to provide the first and second composite video output signals.

11. A method of sequentially combining a plurality of video input signals to form a composited video output signal, each video input signal having an associated depth signal, using a serial combiner having as inputs the video input signals and a plurality of priority signals derived from the depth signals and as an output the composited video output signal, comprising the steps of:

routing the video input signals to appropriate inputs of the serial combiner as ordered video input signals according to a matrix control signal;

sorting the depth signals in order from farthest to nearest as sorted depth signals, the sorting step providing the matrix control signal for the routing step so that the ordered video input signals are input to the serial combiner in order from farthest to nearest; and converting the sorted depth signals to the priority signals for input to the serial combiner.

12. The method as recited in claim 11 further comprising the steps of:

delaying the video input signals before the routing step to compensate for delay time introduced by the sorting step in sorting the depth signals; and sequentially delaying the ordered video input signals to compensate for delay time introduced by each combining of prior ones of the ordered video input signals in sequence by the serial combiner.

13. The method as recited in claim 11 wherein the converting step comprises the step of converting the sorted depth signals from the sorting step simultaneously to the priority signals.

14. The method as recited in claim 13 wherein the simultaneous converting step produces the priority signals from the depth signals as a function of a softness parameter.

15. The method as recited in claim 14 wherein the simultaneous converting step comprises the steps of:

generating a softness range from the softness parameter and the nearest depth signal;

combining the softness range with the remaining depth signals to produce interim depth signals; and multiplying the softness parameter by the inverse of the sum of the softness parameter and the interim depth signals to obtain the priority signal for combining the two nearest video input signals, and multiplying each subsequent interim depth signal with the inverse of the sum of that interim depth signal and the further subsequent interim depth signals to obtain the remaining priority signals.

16. The method as recited in claim 15 wherein the simultaneous converting step further comprises the step of limiting the interim depth signals to zero when the result of the softness range combining step produces a negative value.

17. The method as recited in claim 11 wherein the sorting step comprises the steps of:

ordering a fixed number of the depth signals from farthest to nearest in a sorting module to produce interim sorted depth signals; and combining the interim sorted depth signals from more than one sorting module into the sorted depth signals.

18. The method of claim 11 wherein the associated depth signals for non-depth video input signals are provided via an operator interface.

19. The method according to claim 11 further comprising the step of controlling the combining and sorting steps so that a first composite video output signal from a first set of the video input signals is provided in response to a user control command and a second composite video output signal from a second set of the video input signals is provided in response to the user control command, the first set of video input signals having apparent depth signals nearer than apparent depth signals for the second set of video input signals and the serial combiner being separated into corresponding first and second serial combiners having the first and second sets of video input signals as inputs respectively to provide the first and second composite video output signals.

* * * * *